United States Patent [19]
Mendenhall et al.

[11] Patent Number: 5,026,988
[45] Date of Patent: Jun. 25, 1991

[54] METHOD AND APPARATUS FOR TIME OF FLIGHT MEDIUM ENERGY PARTICLE SCATTERING

[75] Inventors: Marcus H. Mendenhall, Nashville; Robert A. Weller, Brentwood, both of Tenn.

[73] Assignee: Vanderbilt University, Nashville, Tenn.

[21] Appl. No.: 627,609

[22] Filed: Dec. 11, 1990

Related U.S. Application Data

[63] Continuation of Ser. No. 409,460, Sep. 19, 1989, abandoned.

[51] Int. Cl.[5] ........................ B01D 59/44; H01J 49/40
[52] U.S. Cl. .................................. 250/287; 250/281; 250/282; 250/286; 250/305
[58] Field of Search ............... 250/287, 286, 281, 299, 250/300, 294, 282, 305, 309

[56] References Cited

U.S. PATENT DOCUMENTS

| | | | |
|---|---|---|---|
| 3,394,252 | 7/1968 | Gohlke et al. | 250/287 |
| 3,480,774 | 11/1969 | Smith | 250/309 |
| 3,668,384 | 6/1972 | Moorman et al. | 250/287 |
| 4,072,862 | 2/1978 | Mamyrin et al. | 250/286 |
| 4,489,237 | 12/1984 | Litherland et al. | 250/287 |
| 4,611,118 | 9/1986 | Managadze | 250/287 |
| 4,625,112 | 11/1986 | Yoshida | 250/287 |
| 4,677,295 | 6/1987 | Negra et al. | 250/287 |
| 4,694,168 | 9/1987 | Le Beyec et al. | 250/287 |
| 4,731,532 | 3/1988 | Frey et al. | 250/287 |
| 4,777,363 | 10/1988 | Eiceman et al. | 250/287 |
| 4,778,993 | 10/1988 | Waugh | 250/287 |
| 4,818,862 | 4/1989 | Conzemius | 250/281 |
| 4,831,254 | 5/1989 | Jenkins | 250/287 |

OTHER PUBLICATIONS

Gloeckler et al., "Time-of-Flight Technique, Nucl. Instr. and Methods" 165 (1979) 537-544.

Smeenk et al., "Angle Resolved Detection, Nucl. Instr. and Methods," 1985 (1982) 581-586.

Mendenhall et al., "A Time-of-Flight Spectrometer, Nucl. Instr. and Methods in Physics Research," B40141 (1989) (1239-1243).

*Primary Examiner*—Jack I. Berman
*Assistant Examiner*—Kiet T. Nguyen
*Attorney, Agent, or Firm*—Arnold B. Silverman; Rita M. Rooney

[57] ABSTRACT

A method and apparatus for determining material properties such as composition and structure of the surfaces of bulk materials and thin film sample members using time-of-flight medium energy particle scattering is provided. The method and apparatus are based upon scattering particles from a sample material or ejecting particles from the sample material. The particles may include both uncharged particles and charged particles. Particles are scattered into a chamber from a sample surface using known methods. The particles pass through the first of two grids which grid is held at ground potential and which limits the electrostatic field. The particles then pass through a very thin carbon foil which is held at a potential of $-3$kV. On passing through the carbon foil the particles emit secondary electrons. An electric field is created between the carbon foil and the second grid, which accelerates the secondary electrons. The electrons strike a first microchannel plate detector and this generates a start pulse. The scattered particle continues in the chamber to a second microchannel plate detector. When the particle strikes the detecetor a stop pulse is generated. The interval between the start pulse and the stop pulse is used in generating an energy spectrum which is a signature of the composition of the sample material. A very fast timing resolution is provided at low cost using relatively small sized equipment in combination with readily available accelerator equipment.

34 Claims, 3 Drawing Sheets

METHOD AND APPARATUS FOR TIME OF FLIGHT MEDIUM ENERGY PARTICLE SCATTERING

This is a file wrapper continuation application based upon application Ser. No. 07/409460 filed Sept. 19, 1989, now abandoned.

BACKGROUND OF THE INVENTION

1. Field of the Invention

This invention relates to analysis of materials by means of time-of-flight medium energy particle scattering. More particularly, the invention is directed towards a time-of-flight technique which is sensitive to both ions and neutral atoms.

2. Background Information

The method and apparatus of the present invention is directed toward surface analysis by Medium Energy Particle Scattering (MEPS). The invention relates to a novel method and related apparatus for time-of-flight measurement of particle velocities for use with medium energy particles. "Medium Energy Particles" as used herein means particles having an energy of between 10 keV/u and 200 keV/u where a keV/u is a kilo-electron-volt per atomic mass unit.

Prior art techniques for determining the composition of a surface include: Auger Electron Spectroscopy (AES), Secondary Ion Mass Spectrometry (SIMS), Low Energy Ion Scattering (LEIS), also called Ion Scattering Spectrometry (ISS), charged-particle sensitive (energy or momentum dispersive) Medium Energy Ion Scattering (MEIS), and Rutherford Backscattering Analysis (RBS). In each of these techniques, a probe beam of particles is directed onto the surface to be investigated. The interaction of one of these primary beam particles with the atoms of the surface material causes either the emission of a particle or the reflection of the primary particle. The analysis of this emitted or scattered particle's properties gives information about the surface.

It is known that RBS most directly provides reliable quantitative information about the composition of the surface under study. This is because RBS depends upon the Coulomb interaction between the nucleus of the primary ion and that of the surface atom with which it collides. This makes RBS much less sensitive to the chemical environment of the surface than other techniques, almost all of which depend upon atomic phenomena for their effectiveness. The technique of the present invention employs the Coulomb interaction, while attaining the much higher cross-section associated with lower energy scattering as discussed in more detail hereinafter.

Prior art time-of-flight detector designs include particle telescopes used for mass identification of particles emitted in nuclear reactions and occurring in the ambient space environment (See Gloeckler et al., "Time of Flight Technique for Particle Identification at Energies from 2–400 keV/Nucleon", Nucl. Instr. and Methods 165(1979) 537-544; U.S. Pat. No. 4,611,118, U.S. Pat. No. 4,072,862 and other mass spectrometers such as U.S. Pat. No. 4,818,862.)

Various other time-of-flight systems have also been known. See U.S. Pat. No. 4,831,254 for an ion drift detector, and U.S. Pat. No. 4,677,295 for a plasma desorption time-of-flight detector.

None of these prior art methods provide high-resolution measurement of the velocities of charged and neutral particles in the medium energy range (as defined above). In general, the detectors in widespread use today are solid state Si surface barrier detectors. These devices are simple, accurate and inexpensive, but even the best have an alpha particle energy resolution of about 10 keV. This relatively high value sets a lower limit on the energy of the beam of several hundred keV. Electrostatic detectors provide high resolution in this energy range, but are only capable of detecting ions.

There remains a need for a detector which is equally sensitive to both scattered ions and neutrals and which will allow reliable particle scattering analysis using particle beams with lower energies. There is a need for detectors providing the same precision, speed, ease of use as found in the conventional RBS methods and offering increased sensitivity, surface specificity and depth resolution. There is also an important need for a quantitative surface analytical technique which can be carried out using accelerators capable of providing particles in the medium energy range, as such accelerators are much more widely available and less costly than those which provide high energy particles.

SUMMARY OF THE INVENTION

These and other needs are satisfied by the method and related apparatus consisting of a spectrometer to be used in medium energy particle scattering analysis, including backscattering and elastic recoil detection. The invention involves a time-of-flight technique. In the detector of the present invention, a start pulse is produced by a microchannel plate detecting secondary electrons emitted on the passage of the particle through a very thin carbon foil member which may be on the order of 1 $\mu g/cm^2$ thick. A stop pulse is produced by the impact of the same particle on a microchannel plate which may or may not be the same plate used to detect the electrons.

It is an object of the invention to provide a method and related apparatus for surface analysis by medium energy particle scattering and time-of-flight detection.

It is another object of the invention to provide a detector compatible with standard ultra-high vacuum practices.

It is another object of the invention to provide a method which will be sensitive to both scattered neutrals and ions.

It is another object of the invention to provide a detector capable of simultaneous detection of particles over a wide range of energies.

It is another object of the invention to provide a detector with high resolution and a solid angle that is as large as possible consistent with this resolution.

It is another object of this technique to allow either charged or neutral analyzing beams to be utilized so that analysis of insulating materials can be carried out.

It is another object of the invention to exploit the large scattering cross section available with particles in this energy range to provide high sensitivity for elemental detection, while remaining at a high enough energy that this cross section is accurately calculable.

It is a further object of this invention to provide more rapid and quantitative analyses than is possible with electrostatic or magnetic analyzers and to thus insure minimal radiation exposure of the analyzed sample.

It is a further object of the invention to provide higher resolution and faster analysis than would be possible using pulsed beam time-of-flight systems.

These and other objects of the invention will be more fully understood from the following description of the invention, with reference to the illustrations appended hereto.

BRIEF DESCRIPTION OF THE DRAWINGS

A full understanding of the invention can be gained from the following description of the preferred embodiments when read in conjunction with accompanying drawings in which.

DESCRIPTION OF THE PREFERRED EMBODIMENTS

Figure 1:
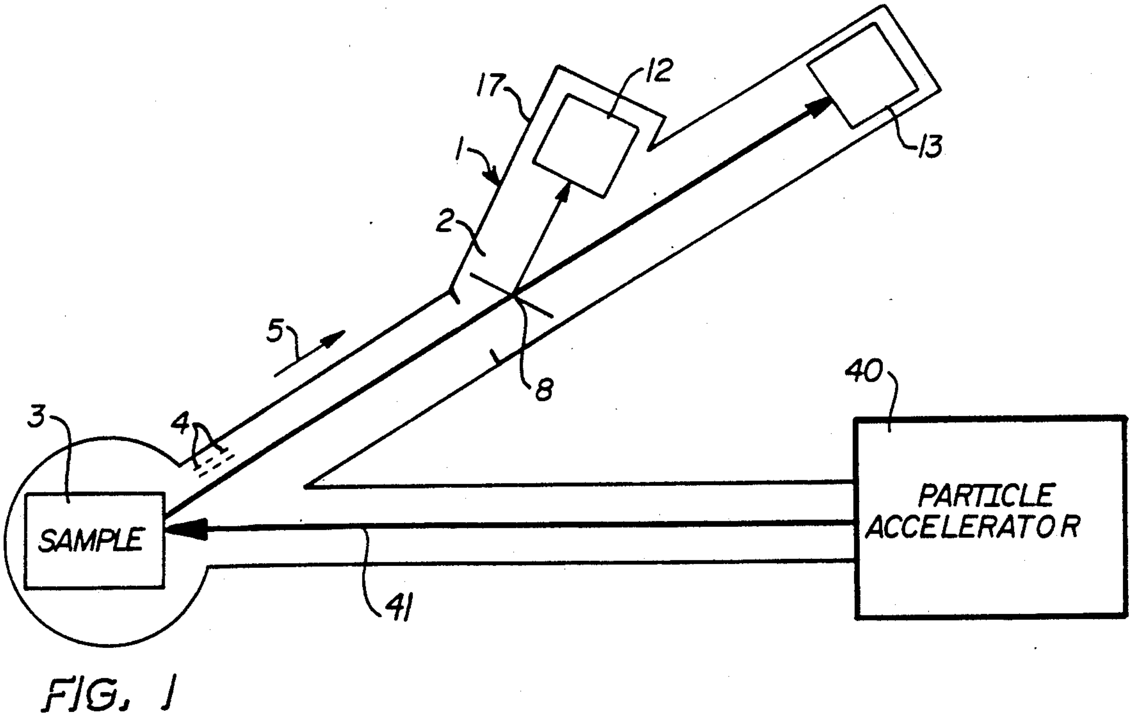
FIG. 1 is a schematic illustration of one embodiment of the invention and the associated accelerator and the sample under analysis.

Referring now to FIG. 1, there is shown a schematic diagram of one embodiment of the present invention. The particle accelerator 40 directs a beam of particles 41 which may be either charged particles or neutral particles towards the sample 3 to be analyzed. Particles 4 are scattered from sample surface 3 in direction 5, into the detector chamber 1. The components of detector chamber 1 are more clearly shown in FIG. 2.

Figure 2:
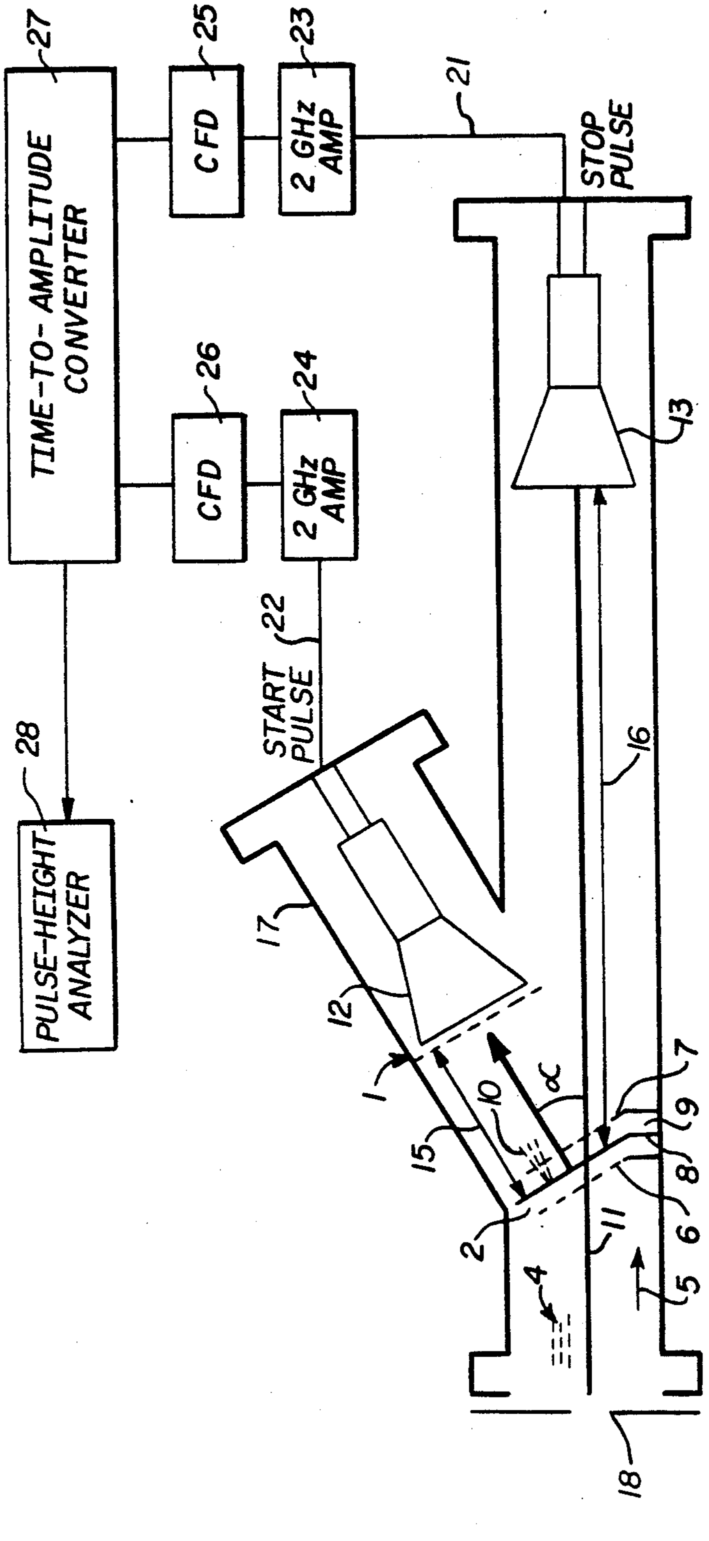
FIG. 2 is a schematic illustration of a time-of-flight spectrometer incorporating one embodiment of the invention.

Referring to FIG. 2, the housing 1 encloses an evacuated flight path region 2. Housing 1 is a generally elongated cylindrical tube constructed using standard ultra-high vacuum construction techniques which are known to those skilled in the art. Housing 1 also includes an off-axis chamber generally designated as 17. The length of housing 1 preferably is between about 40 and 200 cm and is most preferably 60 cm. The region 2 has two grids 6, 7 at one end thereof which grids are held at ground potential. The grids are each preferably constructed of a high transmission nickel mesh and preferably have a diameter of 1.6 cm. Disposed between the two grids 6, 7 is a very thin self-supporting carbon foil 8 of preferably 1 $\mu g/cm^2$ which is at a potential of $-2.5$ to $-5$ kV, and is preferably at $-3$ kV. The carbon foil 8 is preferably round and about 1.3 cm in diameter.

The distance between the first grid 6 and the carbon foil 8 is preferably between 1 mm and 10 mm and is most preferably 3 mm. The distance between the carbon foil 8 and the second grid 7 is preferably between 1 mm and 10 mm and is most preferably 3 mm.

A first microchannel plate detector 12 is placed at an angle $\alpha$ which is preferably about 30° with respect to the axis 11 created by connecting the center point of grids 6, 7 and foil 8. The angle $\alpha$ is determined based upon the dimensions of the microchannel plate detector 12 and the chamber 2. Preferably the angle is relatively small as the angle of the carbon foil 8 relative to the stop detector 13 affects the resolution of the device. The distance (depicted by the numeral 15 of FIG. 2) between carbon foil 8 and first microchannel detector 12 is as small as possible and in the exemplary embodiment, given the size of the microchannel plates 12 and 13, is preferably 11 cm.

A second microchannel plate 13 is disposed within chamber 2 along the axis 11. The flight path distance (depicted by the numeral 16 of FIG. 2) between carbon foil 8 and second microchannel detector 13 is between about 10 cm and 2 meters, and is preferably about 36 cm. Suitable microchannel plates would be Galileo FTD-2003 microchannel plates which have a special 50 ohm anode designed for fast timing application, marketed by Galileo Electro-Optics Corp. of Massachusetts.

Figure 3:
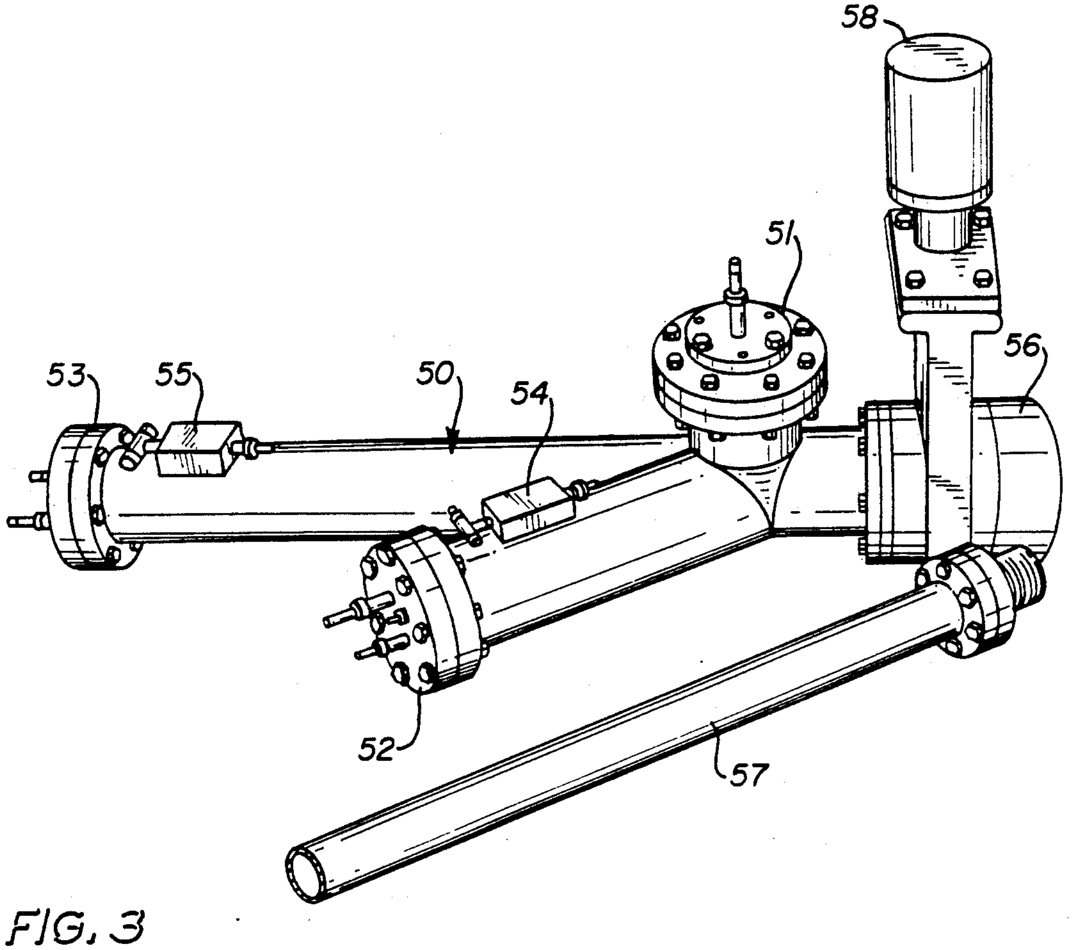
FIG. 3 is an isometric view of the embodiment of the present invention shown in FIGS. 1 and 2.

Referring to FIG. 3, an isometric view of the embodiment of FIGS. 1 and 2 in reverse direction is shown. It is noted that FIGS. 1 and 2 are schematic illustrations in reverse orientation from the isometric view shown in FIG. 3. The device of the present invention is enclosed in external housing 50. The sample onto which the particles are directed is housed in a vacuum chamber (not shown) which would be connected at flange 56. Particles enter the vacuum chamber from beamline 57 which is connected to a particle accelerator (not shown). Particles scattered from the sample enter the housing 50 through the valve assembly 58. The valve assembly 58 allows the detector housing 50 to be isolated from the remainder of the vacuum system. The carbon foil holder assembly 51 is disposed in front of area 56 so that particles will strike the foil after being scattered from the sample surface as discussed more fully below.

The start detector housing 52 is disposed in an off-axis position from the foil holder assembly 51. Start pulse amplifier 54 receives pulses from the start detector as described in detail hereinafter. The stop detector housing 53 is placed axially along housing 50 directly opposite foil holder assembly 51. Stop pulse amplifier 55 receives pulses from the stop detector 53 as described in detail hereinafter.

In operation, the time-of-flight detector of the present invention is used in conjunction with a particle accelerator and sample surface 3. (FIG. 1). A suitable particle beam device directs particles 41 towards sample surface 3 and the beam particles or the recoil particles from the sample are scattered into chamber 2 in the direction 5. (FIG. 2.) As shown in FIG. 2, an angle-defining aperture 18 may be placed between the sample 3 and the grid 6 in order to limit the angular acceptance of the detector to attain the highest resolution. The particles 4 pass through first grid 6 towards carbon foil 8. (FIG. 2.) Grid 6 acts as an electrostatic shield which ensures that particles 4 are not deflected from their scattered trajectories. As a particle 4 passes through foil 8 it causes the emission of secondary electrons 10. The electrons 10 are accelerated by the electrostatic field created by the potential difference between the carbon foil 8 which is negatively biased as stated hereinbefore and second grid 7 which is held at ground potential. Electrons 10 pass through flight path 15. The electrons 10 strike the first microchannel plate 12 and generate a start pulse which is sent through an amplification and pulse-shaping chain as described in detail hereinafter to time-to-amplitude converter 27. (FIG. 2.)

In the meantime, as shown in FIG. 2, the particles 4 continue past the second grid 7 along flight path 16. Particles 4 are then stopped by a collision with a second microchannel plate 13 which generates a stop pulse. The stop pulse is similarly sent to an amplification and shaping assembly 23, 25 as discussed in greater detail hereinafter.

In another embodiment of the invention, a second carbon foil (not shown) may be placed very close to the front of the microchannel plate 13 and biased about 200 volts negative with respect to it to generate secondary electron showers on the plate to improve the efficiency of the plate for detecting particles.

It should be understood that the microchannel plates could also be replaced by other types of electron multipliers, or by other particle detectors such as Si surface barrier detectors.

Figure 5:
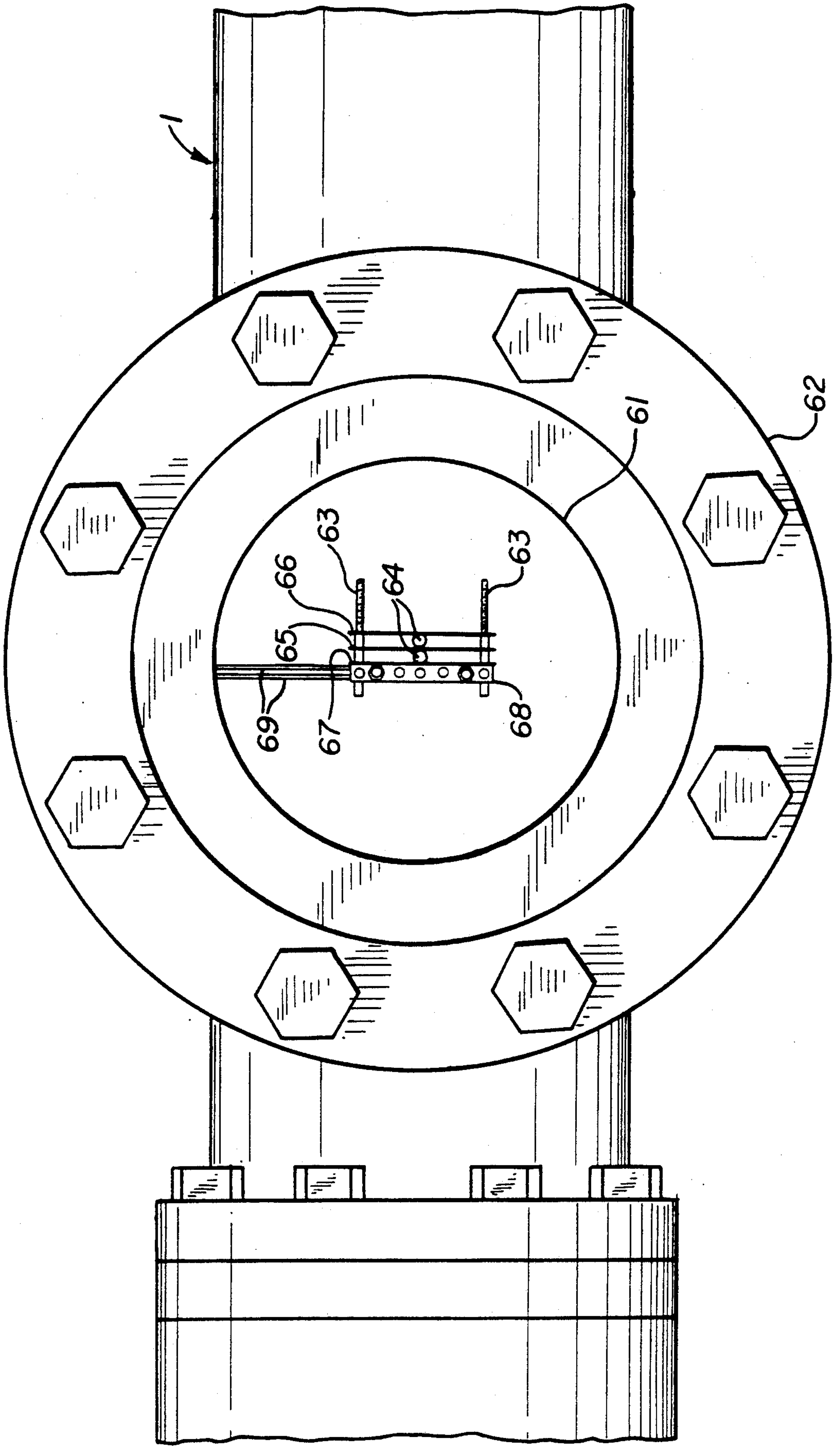
FIG. 5 is a view of the start-pulse generating assembly used in one embodiment of the invention.

Referring now to FIG. 5, the start foil assembly is shown in greater detail. Window 61 having frame 62 may be provided through the housing 1 of the device of the present invention for ease of view, but it is not necessary for the operation of the device. Plates 66 and 67 hold grids (not shown) which, as discussed hereinbefore, perform the function of limiting and defining the electrostatic field used in the present invention. The plates are preferably comprised of stainless steel and they have a ⅜ inch hole in the center thereof exposing the nickel mesh grid. The plates are preferably one inch squares.

The carbon foil (not shown) is held on a nickel mesh by center plate 65 which is also preferably comprised of stainless steel. Plate 65 preferably has a ½ inch diameter hole therethrough to expose the 1 $\mu g/cm^2$ carbon foil.

The plate assembly is held together by rods 63 which are preferably composed of alumina which functions as an electrical insulator. Separating balls 64 are disposed between each plate. Balls 64 are preferably composed of sapphire which is an excellent electrical insulator and which can be manufactured to very fine tolerances. Mounting frame 68 and bars 69 hold the entire foil assembly in place in the housing 1.

As shown in FIG. 2, the pulse amplification and shaping chain consists of fast pulse amplifiers 23 and 24, and constant fraction discriminators 25 and 26. Suitable devices for the amplifiers are Phillips Scientific Model 6954B-10 amplifiers manufactured by Phillips Scientific of New Jersey. Suitable devices for the constant fraction discriminators are Phillips Scientific model 6915. Preferably, the discriminators use 700 ps pulse shaping cables and have −100 mV threshold. The output of microchannel plate detector 12 is applied to input 22 of pulse amplifier 24. Similarly, the output of microchannel plate detector 13 is applied to input 21 of pulse amplifier 23. The amplified signals are provided to constant-fraction discriminators 26 and 25, respectively. The output of constant-fraction discriminators 26 and 25 are sent to a time-to-amplitude converter 27 and the output of the converter is histogrammed on a multichannel analyzer 28. A suitable device for the time-to-amplitude converter is an Ortec model 566, made by EG&G Ortec of Tennessee. The multichannel analyzer could be any standard nuclear-physics type instrument as is known to one skilled in the art. It should be understood that the data from the multichannel analyzer can be processed using standard techniques known to one skilled in the art.

The measured time between the start and stop pulses must be corrected for the easily calculated flight time of the secondary electrons to arrive at the actual flight time for the particles.

In the method of the embodiment of the present invention which is shown in FIG. 1, initially mono energetic particles 41 are scattered from a sample material surface 3 into the detector 1 or, in another configuration, the ejected recoil particles (not shown) from the sample are allowed to enter the detector and follow the path described hereinbefore. The start and stop pulses are generated as discussed hereinbefore and the time-of-flight information is processed to determine energy values. The distribution of energies of the scattered or ejected particles constitutes a signature of the atomic species present in the sample material, along with the distribution in depth of various atomic species in the sample. Further, the number of scattered particles at a particular energy is a direct measure of the amount of a particular atomic species in the target. The analysis of data from this device will be readily understood by one skilled in the art.

Figure 4:
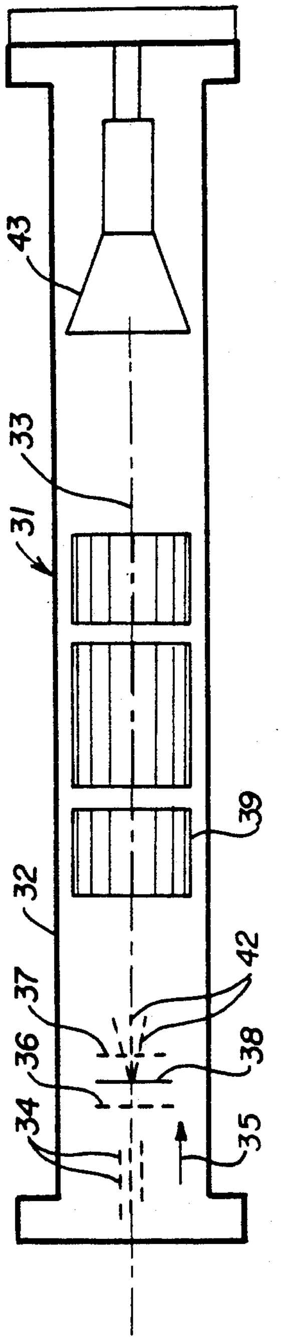
FIG. 4 is a schematic illustration of a time-of-flight spectrometer incorporating a second embodiment of the present invention.

A second preferred embodiment of the invention is shown in FIG. 4. In this embodiment of the invention, particles are scattered as described above toward grid 36. Grids 36, 37 are placed on opposite sides of the carbon foil 38. It is noted that the grids 36, 37 of FIG. 4 are placed generally perpendicular to the axis of the detector 33, whereas in the device of FIG. 2, the grids 6 and 7 are at an angle so as to direct secondary electrons 10 into first microchannel plate detector 12.

Referring still to FIG. 4, carbon foil 38 is at a negative potential as discussed hereinbefore, whereas grids 36 and 37 are held at ground potential. This provides an electrostatic field for acceleration of the secondary electrons 42.

Lens 39 may be provided to focus the electrons to ensure that most of the electrons travel to the single detector 43, which in this embodiment is a microchannel plate as described above. The multipiece lens may be an Einzel lens as could be constructed by one skilled in the art.

The single detector 43 allows great simplicity of design and reduces the cost of the device.

In operation of this embodiment, particles 34 travel in the direction 35 towards carbon foil 38. (FIG. 4.) The particles pass through carbon foil 38 and emit secondary electrons 42. The electrons 42, travelling at a much faster speed than the particles, proceed through focusing lens 39 and strike detector 43. This generates the start pulse. The slower particles continue through the chamber 31 and also strike detector 43 thereby generating a stop pulse. The time-to-amplitude converter (not shown) discriminates between the start and stop pulses, and this function would be readily understood by those skilled in the art.

In the method of the embodiment shown in FIG. 4, the particles are scattered as indicated above and the time-of-flight is measured from the start and stop pulses generated as discussed hereinbefore. The pulses from the amplifier and constant-fraction discriminator described above are split and fed to both the start and stop input a time-to-amplitude converter as described above.

The actual timing calculations for both embodiments discussed above are done using trivial kinematic formulas from classical physics, which are exact for this calculation and are discussed in detail in Mendenhall and Weller, "A Time of Flight Spectrometer for Medium Energy Ion Scattering", Nucl. Instr. and Methods in Physics Research B40/41 (1989) 1239–1243.

The timing resolution of the detector of FIG. 2 is between about 100 and 500 picoseconds. An example of the performance of the detector of FIG. 2 is shown in FIG. 6, shown below, in which 5.3044 MeV $^{210}Po$ alpha particles from a radioactive source were allowed to pass through the embodiment shown in FIG. 2 to determine the ultimate timing resolution of this embodiment. The width of the peak shown in Plot A is between 140 ps and 200 ps, depending upon the method used for defining the width. The peak appears to be an unresolved composite of two narrow structures, so it is hard to use normal peak-width parameters to describe it.

An example of a spectrum produced following the methods described above and produced by the embodiment described in FIG. 2 is shown in FIG. 7. This spectrum is the result of scattering 450 keV $C^{++}$ ions from a target consisting of very thin layers of Au, Ag and Cu on a thick Al substrate. The spectrum is labeled to show the peaks resulting from the scattering of of the beam from the different species on the surface. Further, there is a broad feature labeled Al on the right of the plot which is a result of the scattering of the beam from the thick substrate combined with inelastic energy losses of the beam in the substrate. The shape of this spectrum would be well understood by one skilled in the art. The three species Au, Ag, Cu on the surface are present at coverages of $3\times10^{13}$ atoms/cm$^2$, $1.0\times10^{14}$ atoms/cm$^2$ and $2.7\times10^{15}$ atoms/cm$^2$, respectively.

It will be appreciated from the foregoing that the presently disclosed time-of-flight technique is superior to the known procedure using electrostatic analyzers in two very important respects. First, the present invention provides a method which is sensitive to both scattered neutrals and ions whereas the previously known electrostatic analyzers detect only ions. Second, it will be appreciated that the time-of-flight technique of the present invention is inherently capable of analyzing the flight time of each particle that enters the sensitive solid angle of the device.

It should also be appreciated that, when compared with other apparatus for medium energy scattering (See Smeenk, et al., "Angle Resolved Detection of Charged Particles with a Novel Type Toroidal Electrostatic Analyzer", Nucl. Instr. and Methods 195 (1982) 581-586) the design of the present invention is greatly simplified and is of very low cost yet it provides comparable energy resolution and more readily quantifiable and reliable information about the composition of the surface material.

Whereas particular embodiments of the invention have been described above for purposes of illustration, it will be appreciated by those skilled in the art that numerous variations of the details may be made without departing from the invention as described in the appended claims.

What is claimed is:

1. A method of analyzing material properties using medium energy particle scattering from a sample member, comprising the steps of:

(a) providing a housing containing a carbon foil and having a first and second flight path disposed between said carbon foil and a first detector and a second detector;

(b) scattering particles from the sample member to generate backscattered particles representative of the full sample member whereby analysis of said material properties is effected by simultaneously examining particles of all energies which are backscattered from said sample member;

(c) directing the backscattered particles through said carbon foil, to establish the emission of secondary electrons from substantially all of said backscattered particles passing through said carbon foil;

(d) accelerating said secondary electrons using an electrostatic field disposed generally in the region of said carbon foil;

(e) generating a start pulse when each said secondary electron strikes the first detector;

(f) generating a stop pulse when each said backscattered particle which had passed through said carbon foil strikes the second detector;

(g) generating flight time information based upon the time interval between said start and stop pulses; and (h) processing said flight time information and calculating material properties of said sample member.

2. The method of claim 1 including scattering particles having an energy between about 10 keV/u and 200 keV/u.

3. The method of claim 2 including generating an energy spectrum indicative of the composition of the sample member.

4. The method of claim 3 including generating said spectrum with a timing resolution between about 100 and 500 picoseconds.

5. The method of claim 4 including directing said backscattered particles through said carbon foil which is held at a potential of between about $-2.5$ and $-5$ kV.

6. The method of claim 5 including calculating at least one of the velocity of said backscattered particles and the kinetic energy thereof and thereby deducing the mass of atomic species composing said sample member.

7. The method of claim 1 including determining the composition and microscopic structure of said sample member from said flight time information.

8. The method of claim 1 including scattering particles which are selected from the group consisting of ions and neutral particles.

9. A method of analyzing material properties using medium energy particle scattering from a sample member, comprising the steps of:

(a) providing a housing containing a carbon foil and defining a flight path between said carbon foil and a detector;

(b) scattering particles from the sample member to generate backscattered particles representative of the full sample member whereby analysis of said material properties is effected by simultaneously examining particles of all energies which are backscattered from said sample member;

(c) directing the backscattered particles through said carbon foil, to establish the emission of secondary electrons from substantially all of said backscattered particles passing through said carbon foil;

(d) accelerating said electrons using an electrostatic field disposed generally in the region of said carbon foil;

(e) generating a start pulse when each said secondary electron strikes the detector;

(f) generating a stop pulse when each said backscattered particle which had passed through said carbon foil strikes the detector;

(g) generating flight time information based upon the time interval between said start and stop pulses; and (h) processing said flight time information and calculating material properties of said sample member.

10. The method of claim 9 including generating an energy spectrum related to composition of said sample member.

11. The method of claim 10 including generating said spectrum with a timing resolution between about 100 and 500 picoseconds.

12. The method of claim 11 including scattering particles having an energy between about 10 keV/u and 200 keV/u.

13. The method of claim 12 including directing said backscattered particles through said carbon foil which is at a potential of between about −2.5 and −5 kV.

14. The method of claim 13 including providing a focusing lens to direct said secondary electrons towards the detector.

15. The method of claim 9 including calculating at least one of the velocity of said backscattered particles and the kinetic energy thereof and thereby deducing the mass of atomic species composing said sample member.

16. The method of claim 9 including determining the composition and microscopic structure of said sample member from said flight time information.

17. The method of claim 9 including scattering particles which are selected from the group consisting of ions and neutral particles.

18. An apparatus for the analysis of material properties using medium energy particle scattering, comprising:

an elongated housing defining a chamber for receipt of a sample member, a means for producing a beam of particles to be directed onto said sample member to generate backscattered particles representative of the full sample member whereby analysis of said material properties is effected by simultaneously examining particles of all energies which are backscattered from said sample member, carbon foil means disposed within said chamber in spaced relationship with respect to said sample member whereby backscattered particles traveling from said sample member pass through said carbon foil means and emit secondary electrons on passing though said carbon foil means, electron acceleration means disposed within said chamber operatively associated with said carbon foil means for creating an electrostatic field for accelerating electrons emitted at said carbon foil means, electrostatic field limiting means disposed between the sample member and the carbon foil means for limiting the extent of said electrostatic field in the direction of the sample member, detector means disposed within said chamber in spaced relationship with respect to said carbon foil means on the opposite end of said chamber as the carbon foil means, said detector means generates a pulse signal when each said secondary electron strikes it, and a pulse signal when each said backscattered particle which had passed through said carbon foil strikes it, and signal processing means for receiving said pulse signals and for processing said pulse signals.

19. The apparatus of claim 18 wherein said electron acceleration means comprises grid means disposed within said chamber between said carbon foil means and said detector means and wherein said grid means is held at ground potential and said carbon foil means is held at a potential of between about −2.5 and −5 kV thereby creating an electric field between said carbon foil means and said grid means.

20. The apparatus of claim 19 wherein said electrostatic field limiting means comprises a grid means disposed within said chamber between said carbon foil means and said sample member and wherein said grid means has means for holding said grid means at ground potential thereby limiting the extent of the electrostatic field produced by the carbon foil means in the direction of the sample member.

21. The apparatus of claim 20 wherein said detector means comprises:

(a) a first detector means for generating a pulse signal when each said secondary electron strikes it, said first detector means being disposed within said chamber along an axis which is at an angle to the center axis of said chamber; and (b) a second detector means for generating a pulse signal when each said particle which had passed through said carbon foil strikes it, said second detector means being disposed within said chamber directly opposed to and at a predetermined distance from said carbon foil means.

22. The apparatus of claim 21 wherein said first detector means and said second detector means include microchannel plates.

23. The apparatus of claim 20 including means for generating an energy spectrum indicative of the composition of said sample member.

24. The apparatus of claim 23 wherein said spectrum generating means generates a spectrum with a timing resolution between about 100 to 500 picoseconds.

25. The apparatus of claim 21 wherein said predetermined distance between said carbon foil means and said second detector means is between about 10 cm and 2 m.

26. The apparatus of claim 18 wherein said beam producing means comprises means for producing a particle beam having an energy between about 10 keV/u and 200 keV/u.

27. The apparatus of claim 18 wherein said carbon foil means has a thickness of between about 0.5 and 2 $\mu g/cm^2$.

28. The apparatus of claim 18 including a focusing means for focusing said secondary electrons towards said detector means.

29. The apparatus of claim 18 wherein said signal processing means includes:

time-to-amplitude converter means for receiving incoming pulse signals from said detector means, and means for encoding the time interval between said pulses into an electrical pulse the amplitude of which is related to said time interval;

pulse-height analyzer means for digitally encoding the height of the electrical pulse from said time-to-amplitude converter means; and digital computer means including means for receiving inputs from said pulse-height-analyzer means, means for calculating the apparent flight time of said backscattered particle from the time interval calculated by said time-to-amplitude converter, and means for counting backscattered particles within a particular energy range.

30. The apparatus of claim 29, wherein said digital computer means also includes means for calculating the velocity of said backscattered particle.

31. The apparatus of claim 29, wherein said digital computer means also includes means for calculating the mass of particles in the sample member from which said backscattered particles are scattered.

32. The apparatus of claim 29 wherein said digital computer means also includes means for determining the composition and structure of the sample member from said flight time information.

33. The apparatus of claim 18 wherein said sample member is a bulk material.

34. The apparatus of claim 18 wherein said sample member is a thin film.

* * * * *